July 15, 1952     C. CHRISTENSON     2,603,251
SAW BLADE
Filed June 14, 1946
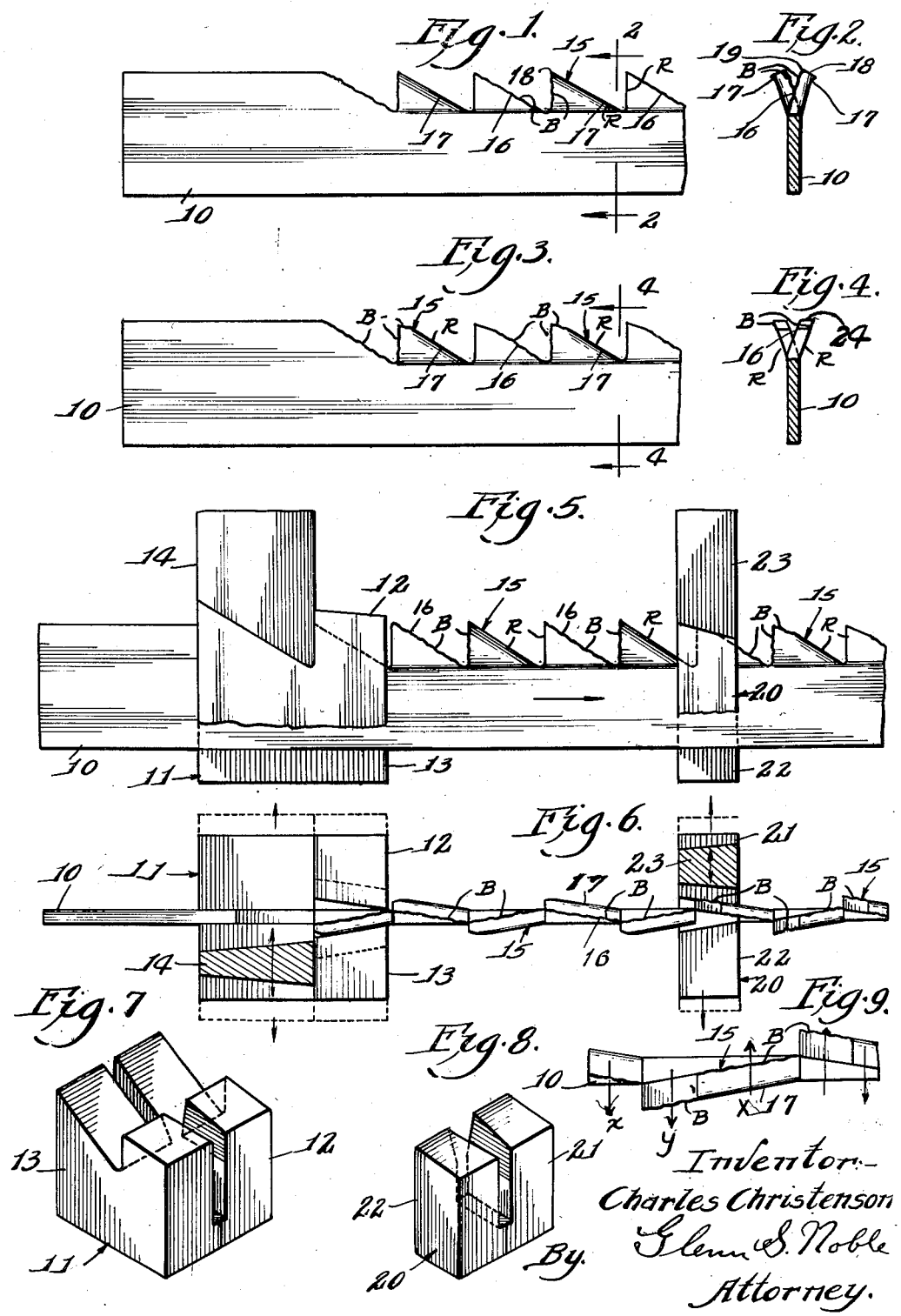
Inventor:—
Charles Christenson
By Glenn S. Noble
Attorney.

Patented July 15, 1952

2,603,251

UNITED STATES PATENT OFFICE 2,603,251

SAW BLADE

Charles Christenson, Chicago, Ill.

Application June 14, 1946, Serial No. 676,773

2 Claims. (Cl. 143—133)

According to one method of making saws, the teeth are formed in the edge of a strip or band by means of punches and dies. In some instances, the strip or band is fed between oppositely disposed dies and the teeth are cut by means of punches operating alternately from opposite sides of the strip. These alternately operating punches and dies are also made to coact to permit the tooth being formed to be bent to one side or set at the same time that the front of the tooth is cut. Saw teeth formed by such punch and die operations are not perfectly formed for satisfactory cutting operations for the reason that the points of the bent or set teeth farthest from a plane through the base of the saw strip are formed by the intersection of one burred or sharp edge and one crushed or dull edge and for this reason these points are not sufficiently sharp. In addition, the transverse cutting edges of the teeth so formed are not at right angles to the saw base, and consequently such teeth are not satisfactory for cutting purposes and particularly where rapid sawing is desired and the present invention relates to a method of finishing or sharpening such teeth to make them as nearly perfect as possible and to the saws made in such manner.

The objects of this invention then are to provide an improved saw having particularly well formed and sharpened teeth. In order to fully disclose the nature and construction of my improved saw, it will be described in connection with the method of forming the same, such method and means being reserved for incorporating in a divisional application.

In the accompanying drawings illustrating this invention,

Fig. 1 is a side view of the saw as commonly made by such punching operation;

Fig. 2 is a sectional view of the same taken on the line 2—2 of Fig. 1;

Fig. 3 is a side view of a saw as shown in Fig. 2 after being completed or sharpened in accordance with this invention;

Fig. 4 is a sectional view taken on the line 4—4 of Fig. 3;

Fig. 5 is a somewhat diagrammatic view illustrating the operation of the teeth forming and setting devices and also my improved teeth finishing or sharpening devices;

Fig. 6 is a plan view of the parts shown in Fig. 5;

Fig. 7 is a perspective view of the forming die;

Fig. 8 is a perspective view of my finishing or sharpening die; and

Fig. 9 is a diagrammatic view illustrating the several cuts made by the punches in forming and setting the teeth and then in sharpening the same.

The strip or band 10 represents any suitable stock adapted for the manufacture of saws of various kinds. This strip is fed intermittently through a die member 11 having two oppositely disposed dies 12 and 13. The punch 14 is supported and reciprocated by any suitable means (not shown) in order to coact with the dies 12 and 13 to cut substantially triangular pieces of metal from the edge of the band and forming teeth 15. This punch moves first in one direction so as to coact with the die 12 in cutting out the first piece of metal, and the saw is then advanced the length of one tooth and the punch then moves in the opposite direction to cut out the next piece of metal to finish the tooth and to form the back of the next tooth, this operation being continued until all of the teeth are cut. The dies are also shaped as shown to permit the tooth previously cut to be bent or set by the next cutting operation, this general method of cutting saw teeth being more or less commonly known.

However, when teeth are cut or sheared by an operation of this kind, one edge 16 of the back of each tooth will be sharp burred and compressed or hardened due to the action of the punch in forcing the metal against the die. But the other or opposite edge 17 of the back of each tooth where the punch enters or first engages with the metal will be somewhat curved or rounded and will not present a sharp corner or cutting edge. However, the face of such tooth will be sharp on the outer edge; therefore the outer corner of the tooth will be formed by the intersection of one sharp edge and one rounded or dull edge. It will also be noted as indicated in Fig. 2 that the transverse cutting edge 18 forming the extreme end of the tooth is tipped so that it is not at right angles or normal to the blade. This leaves a high corner 19 on the inside of the tooth. It will also be noted that the rounded edges or corners 17 are not hardened and compressed by the punching action as are the opposite corners or edges 16 which are pressed against the coacting dies. For these reasons, it will be seen that the teeth formed by such punching operations are not perfect and are not entirely satisfactory. In other words, such saws do not have teeth which are even theoretically accurately formed for sawing operations. In some instances, it has been proposed to file the teeth, but such filing usually does not produce uniform results and likewise fails to provide satisfactory cutting saws. Attention may here be called to the fact that when a piece of metal is punched out of a sheet by means of a die and punch, the metal around the periphery of the entering side of the punch is rounded or crushed while the metal around the leaving side is burred, sharpened and hardened.

In accordance with this invention, I complete the forming and sharpening of the teeth by means of an additional punching operation which is preferably carried on simultaneously with the forming of the teeth. This is done by additional or auxiliary punch and die members as shown particularly in Figs. 5 to 8.

The die member 20 which is somewhat similar to the member 11 has oppositely disposed dies 21 and 22 between which the saw passes after the teeth have been formed. The punch 23 is supported and reciprocated in any suitable manner to coact with these dies. This punch engages with each tooth on the side opposite from that engaged by the punch 14 in the forming of the tooth. For instance, as shown in Fig. 9, the punch 14 has moved in the direction of the arrows $x$ in cutting the tooth while the punch 23 moves in the direction of the arrow $y$ to coact with the die 22 and shear off a small portion of the cutting end of the tooth sufficient to remove the portion of the curled or rounded edge at the tip of the tooth made by the entry of the punch 14. The action of the punch and die in trimming off this small end or tip of the tooth causes this portion of the opposite edge 17 of the tooth to be sharpened and compressed in a manner similar to the sharpening and compressing of the edge 16 in the tooth forming operation. At the same time, it straightens or cuts off the end of the tooth so that it will be at substantially right angles to the blade as shown at 24, Fig. 4.

This provides a tooth having a cutting point formed by the junction of a burred or sharpened edge on the front of the tooth and a burred or sharpened edge on the back of the tooth. I have found from actual manufacture that saws made in this manner with the cutting points formed at the junction or intersection of such burred or sharpened edges are particularly effective in use and may be utilized for a large variety of sawing operations. Furthermore, this second or auxiliary cutting or sharpening operation may be used to provide a tooth with any desired rake or clearance or backing adjacent to the cutting edge.

Any suitable machine or mechanism may be utilized for causing the synchronous operation of the tooth forming and setting dies and the auxiliary sharpening dies, but it will also be noted that the sharpening operation may be performed independently of the tooth forming operation.

My improved saw blade may be made in any desired sizes and the finishing or sharpening operation will be the same for all such sizes. It may be noted, however, that ordinarily a very small cut will only be necessary to remove the curled or rounded edges of the teeth and provide the desired sharp cutting points or portions—ordinarily a cut of a few thousandths of an inch will be sufficient, although a deeper cut may be made if the tooth is to be given a substantially different contour.

My improved method is particularly applicable to the manufacture of band saws such as used for cutting wood or metal, but may also be utilized wherever it may be found desirable.

Having thus described my invention, what I claim and desire to secure by Letters Patent is:

1. A saw, of the character described, having teeth with cutting points, each of which is formed by the intersection of two burred edges.

2. A saw having teeth, the front of each tooth being burred on one side and rounded on the other, the edges of the back of each tooth being rounded on the same side as the burred edge of the front of the tooth and burred on the opposite side, and a portion of the back edge of each tooth being burred where its meets the burred edge of the front of the tooth to form a sharp cutting point.

CHARLES CHRISTENSON.

REFERENCES CITED

The following references are of record in the file of this patent:

UNITED STATES PATENTS

| Number | Name | Date |
|---|---|---|
| 400,057 | Clemson | Mar. 26, 1889 |
| 555,620 | Salisbury | Mar. 3, 1896 |
| 1,576,908 | Hartig | Mar. 16, 1926 |
| 1,631,657 | Swett | June 7, 1927 |
| 2,120,963 | Biro | June 21, 1938 |
| 2,431,517 | Stevens | Nov. 25, 1947 |

OTHER REFERENCES

Disston Handbook on Saws, by Henry Disston & Sons, Inc., Philadelphia, Pa., copyright 1907 (pages 116 and 117).